Figure 1:
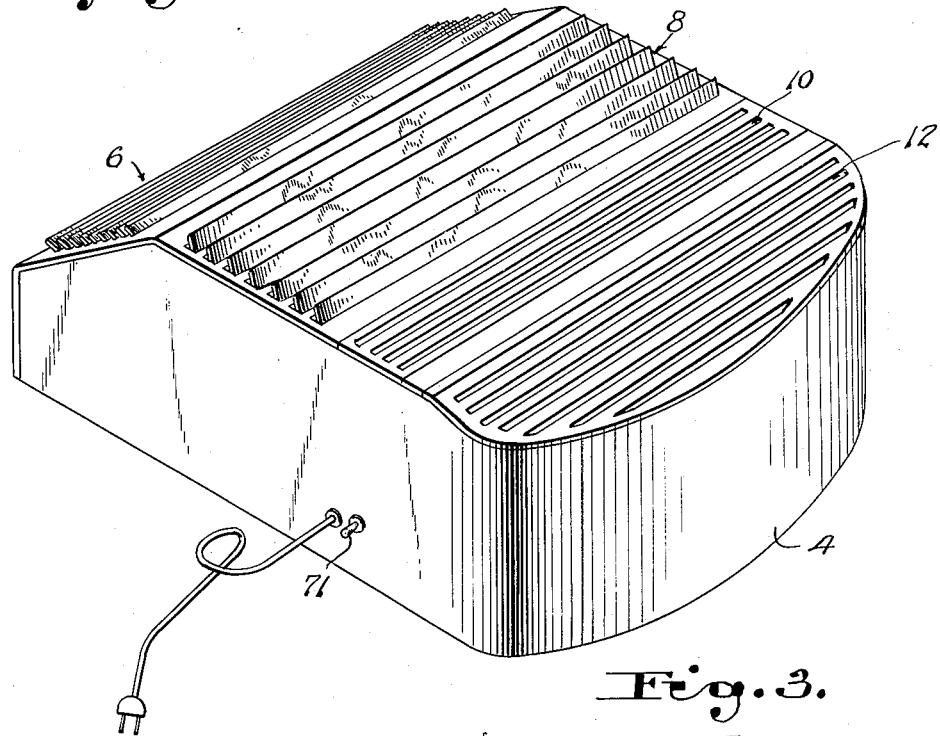

Feb. 28, 1956     C. F. CARLTON     2,736,176
AIR CONDITIONER CHASSIS

Filed Oct. 29, 1953     3 Sheets-Sheet 1

INVENTOR.
Cecil F. Carlton
BY James H. Littlepage
ATTORNEY.

Feb. 28, 1956 C. F. CARLTON 2,736,176
AIR CONDITIONER CHASSIS
Filed Oct. 29, 1953 3 Sheets-Sheet 2
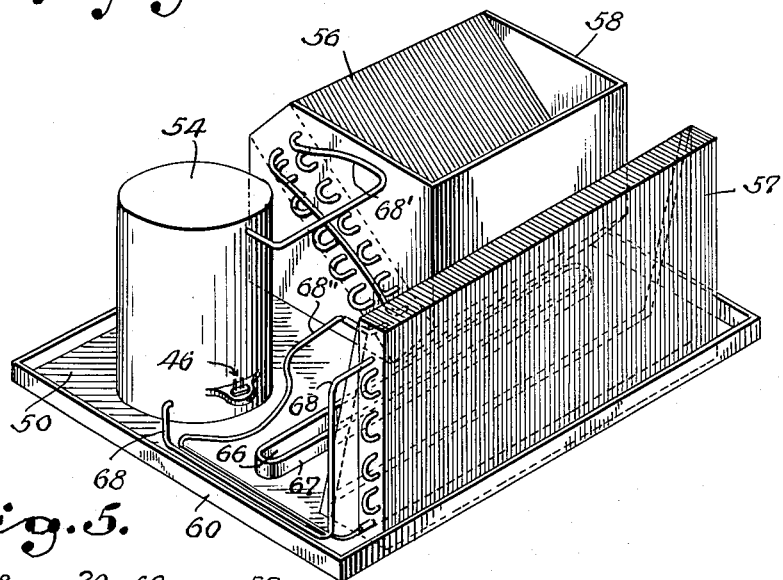
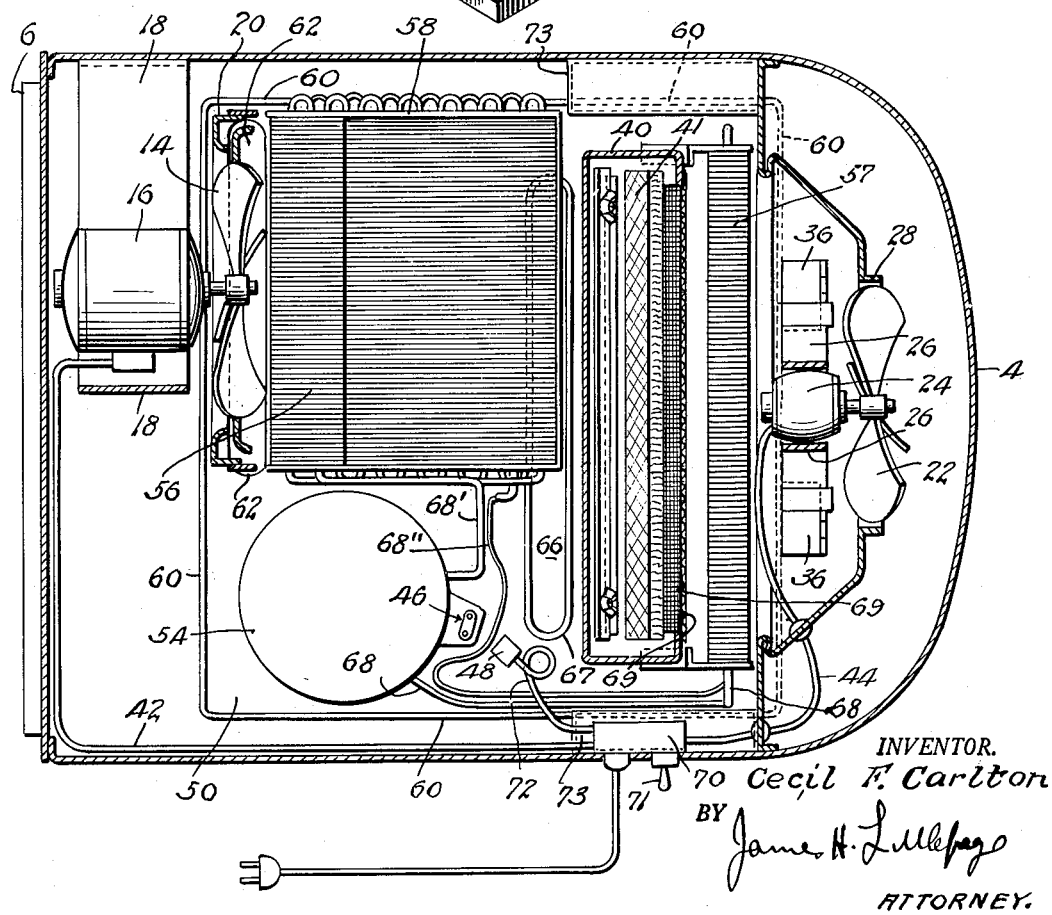
INVENTOR.
Cecil F. Carlton
BY
James H. Lillepego
ATTORNEY.

Feb. 28, 1956 — C. F. CARLTON — 2,736,176
AIR CONDITIONER CHASSIS
Filed Oct. 29, 1953 — 3 Sheets-Sheet 3
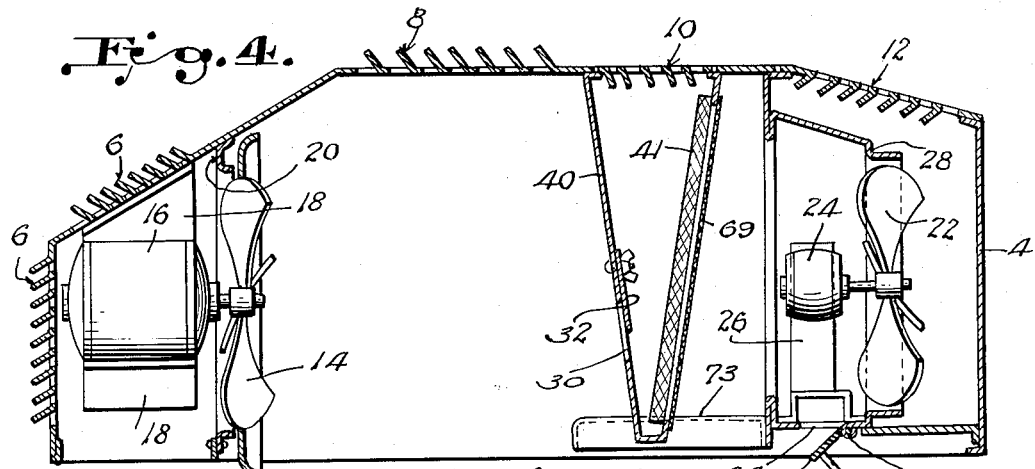
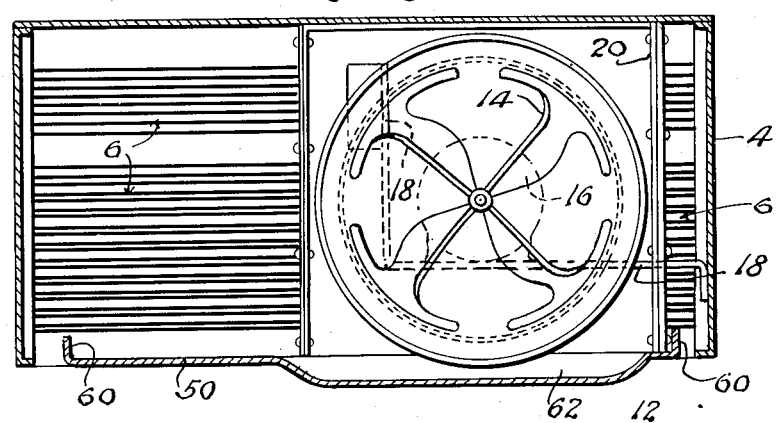
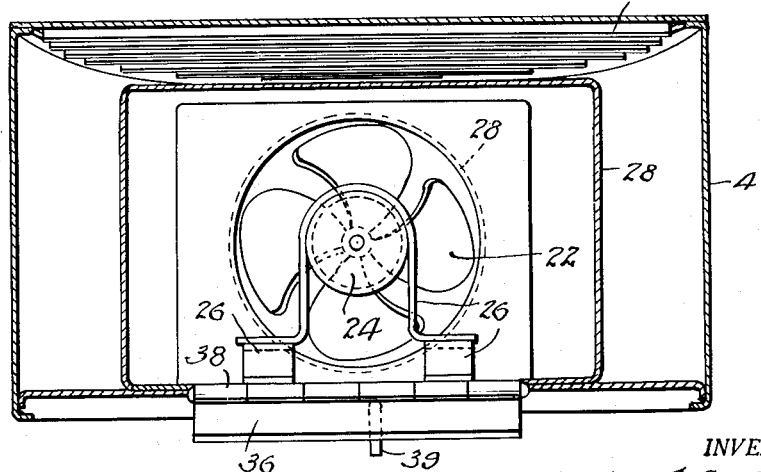
INVENTOR.
Cecil F. Carlton
BY
ATTORNEY.

United States Patent Office 2,736,176
Patented Feb. 28, 1956

2,736,176

AIR CONDITIONER CHASSIS

Cecil F. Carlton, Larchmont, N. Y.

Application October 29, 1953, Serial No. 389,053

7 Claims. (Cl. 62—129)

This invention relates to refrigerating mechanisms of the evaporator, compressor and condenser type and, more particularly, to window-mounted and automobile mounted air conditioners.

The object of the invention is to provide a window-mounted and automobile mounted air conditioner comprised of two unitary assemblies, one consisting of the parts which can be easily repaired or replaced by relatively unskilled servicemen, and the other consisting of the parts which should be worked on only by specialists. More particularly it is intended to provide an air conditioner having, as a top enclosure, a shell within which are mounted the fans and fan motors for cooling a condenser and for drawing air through an evaporator and discharging it into a room or automobile passenger compartment. Also to be a part of the top enclosure are the electrical switch and circuits for all motors, a filter, baffles, dampers, and louvers. These are the parts which can more easily be serviced by a sales organization having elementary shop facilities. Forming a separate bottom for the top enclosure there is a tray-like base on which are affixed a compressor, condenser, evaporator, and fluid piping, these being the elements for which factory or otherwise specialized service is generally needed and which are usually covered by a long factory warranty. The tray-like base is to rest on angle runners with adjustable brackets, clamps, and screws which form a cradle attached to a window sill in the conventional manner or to the floor of the rear trunk compartment of an automobile in a similar manner.

A further object of the invention is the relative arrangements of the components supported on the base and those suspended from the shell so that, when the shell is mounted on the base, the parts suspended therein interfit with those on the base and, when the shell and base are separate from one another, the components are easily accessible for testing, maintenance or repair. More specifically, it is intended now to mount a condenser coil and flue therefor spaced forwardly from the outer end of the base, a compressor and compressor motor assembly laterally adjacent the condenser coil, and to mount an evaporator coil spaced rearwardly from the inner end of the base, with a gap between the evaporator coil and the condenser coil flue. Suspended in the shell adjacent the outer and inner ends thereof are the fans and fan motors respectively for directing cooling air over the condenser coil, and for drawing in air from the exterior of the casing successively through a filter, evaporator, and thence discharging the filtered and cooled air into the room or automobile passenger compartment. Between the fans there is a filter in a frame suspended in the shell and located so that when the shell is mounted on the base, the filter and its supporting frame fit in the gap between the condenser coil flue and the evaporator.

Figure 3:
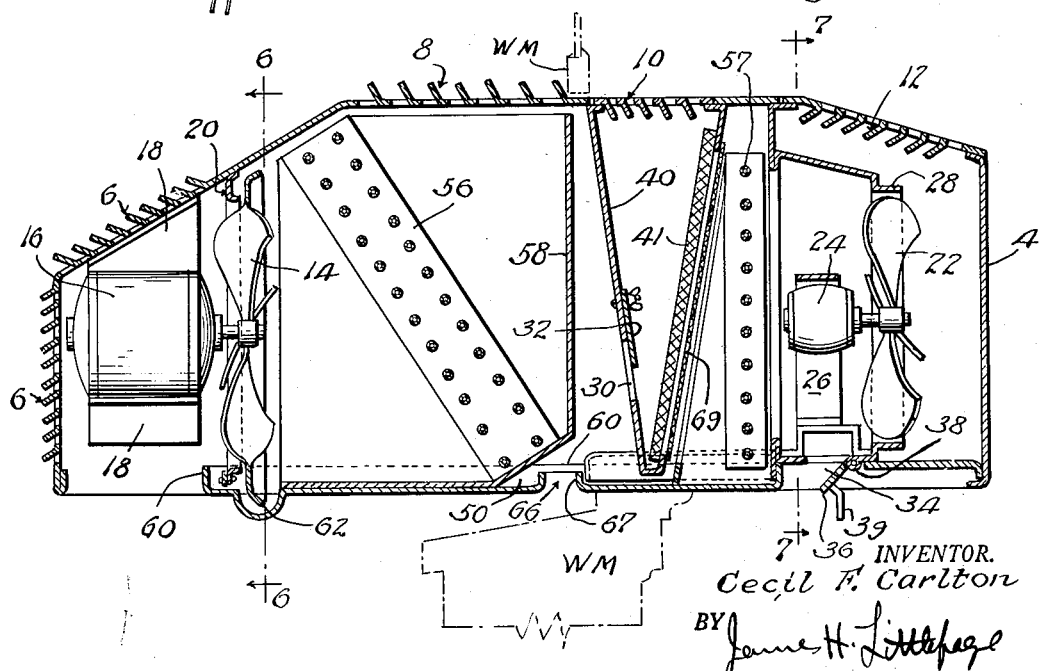

These and other objects, including the arrangement of louvers and dampers will be apparent from the following specification an drawings in which:

Fig. 1 is an isometric view of the air conditioner;
Fig. 2 is an isometric view of the base and elements permanently mounted thereon;
Fig. 3 is a vertical section taken longitudinally through the center of the assembled conditioner;
Fig. 4 is a view similar to Fig. 3 but showing only the shell and elements permanently suspended therein;
Fig. 5 is a plan of the complete assembly with parts shown in horizontal cross section.
Fig. 6 is a vertical cross section taken transversely along the lines 6—6 of Fig. 3; and,
Fig. 7 is a view similar to Fig. 6 along the lines 7—7 of Fig. 3.

Referring now to the drawings in which like reference numerals denote similar elements the air conditioner is comprised of two main units, the enclosure unit being an open bottom shell 4 preferably formed of sheet metal and having formed in the portion adapted to lie outwardly of a window mounting WM, inlet and discharge operative means, i. e., louvers 6 and 8 respectively for condenser cooling air. In the portion adapted to extend inwardly of the conditioned space from window mounting WM are removable inlet return aperture means, i. e., louvers 10 for recirculated air and discharge louvers 12 for the air after it has been cooled.

Referring particularly to Figs. 3, 4, 6 and 7 it will be seen that shell 4 contains and supports all of the mechanisms susceptible to maintenance and repair by local services having ordinary electrical and mechanical skills. Suspended in shell 4 adjacent the outer end is a fan 14 for drawing in air from the exterior for cooling a condenser described hereinbelow. Fan 14 is mounted on and driven by electric motor 16, the latter being supported on a bracket 18 affixed to one side of shell 4 and the top of shell 4. A frame-like cowling 20 surrounds fan 14. Suspended within and adjacent the inner end of shell 4 is a fan 22 for drawing air to be cooled through a filter and an evaporator coil described below, and for discharging the filtered and refrigerated air into a room or automobile passenger compartment through louvers 12. Fan 22 is supported on and driven by an electric motor 24, the latter being bracket-supported in shell 4 as indicated at 26. Fan 22 also has a frame-like cowling and baffle 28 which separates the discharge air plenum from air entering the filter, coil and fan through return louvers 10.

Spaced inwardly from the lower end of cowling 28 is a damper opening 34, the damper 36 for which is pivoted at 38 to the cowling, the damper being controlled by an exterior handle as indicated at 39. It is thus apparent that when damper 36 is opened, room air can be blended with the refrigerated air discharged by fan 22 through louvers 12.

Spaced between fans 14 and 22 is a frame 40 in which a filter 41 is removably supported by wide mesh screen 69. A damper opening 30 in frame 40 is controlled by an adjustable damper 32. As will be seen hereinafter recirculated air introduced through louvers 10 or air drawn in from the exterior through damper opening 30 by fan 22 necessarily passes through filter 41 before being cooled. Electrical circuits 42 and 44 shown in Fig. 5 connect fan motors 16 and 24 to switch box 70 from which socket 48 at the end of another circuit 72 is available to connect the poles 46 protruding from the compressor motor at 54 to the switch box and the power supply when the switch handle 71 is in the required position.

Base 50 is generally in the form of a tray on which rests shell 4 so that the base forms a removable bottom with all of the elements which utilize the refrigerating fluid, namely, the refrigeration compressor and motor assembly 54, finned condenser coil 56, finned evaporator coil 57 and interconnecting pipes 68, 68' and 68''. Surrounding the bottom of base 50 is an upstanding peripheral flange 60 for preventing leakage of condensed moisture which collects on the base, this moisture draining into gutter 62. As shown particularly in Figs. 2, 3 and 5, condenser coil 56 is diagonally supported in a box-like flue 58 so that outside air drawn in through louvers 6 by fan 14 passes first through condenser coil 56 and thereafter is guided by flue 58 so as to return to the atmosphere through louvers 8. The curved rim of fan 14 raises water collected in trough 62 and throws it with the air onto coil 56 where heat of condensation is utilized to evaporate this water so that it can be borne as vapor through flue 58 and louvers 8. The air which passes through and extracts heat and moisture from condenser coil 56 is isolated by flue 58 and returned to the exterior without affecting any of the other elements of the assembly. Near the middle of base 50 is formed an inlet slot 66 for admission of outside air to enter damper opening 30, the inlet slot being surrounded by an upstanding lip 67 so as to avoid intermingling of condensed moisture on base 50 with the air flowing in from the exterior through slot 66. The compressor 54, condenser 56 and evaporator 57 are conventionally connected by fluid piping 68 to form a refrigerating circuit and complete operative refrigerating system. The compressor and motor assembly 54 rests conventionally on coil springs bearing on base 50 to avoid transmission of vibration.

With particular reference to Fig. 3 it will be noted that the relative spacing between the various elements is such that those suspended in shell 4 interfit with those mounted on base 50. When the shell is fitted down on the base, fan 14 and its associated electrical motor are disposed outwardly of condenser 56, while fan 22 and its motor lie inwardly of evaporator 57. Filter 41 is supported between both inlet louvers 10 and outside air inlet slot 66, and evaporator 57. When the shell 4 is engaged over base 50 and the parts placed in operation, fan 14 draws outside air in through louvers 6 and drives the air through condenser 56 to extract heat from the refrigerating fluid flowing therein and the heat-laden air is directed by flue 58 back out through louvers 8 to the atmosphere outside of window WM. Meanwhile, compressor 54 operates to circulate the cooled and condensed refrigerating fluid from condenser 56 under pressure to evaporator 57. Upon reaching evaporator 57, the pressure of the refrigerating fluid drops, whereupon the temperature of the refrigerant drops by evaporating at the lower pressure so that it extracts heat from the air being drawn through the evaporator by fan 22. A portion of the refrigerated air is thus taken from the room or automobile passenger compartment introduced through louvers 10, and cleansed through filter 41. Outside air entering through slot 66 and damper opening 30 is blended in to refresh the air. If damper 34 be opened, fan 22 will maintain circulation of the air but will draw a lesser amount of outside air and recirculated air through evaporator 57. Uncontrolled passage of air between base 50 and shell 4 on both sides forward of the window member and rearward of baffle 28 is prevented by two small baffles 73 extending horizontally from the inside of shell 4 and engaging the upper edge of rim 60 when the shell 4 and the base 50 are assembled in the operating position.

When replacement or cleansing of filter 41 is required louver 10 is removed and filter 41 is removed and replaced through the louver opening. If fan motors 16 or 24 need servicing, shell 4 may easily be removed from base 50 to provide access to those parts or, if desired, a substitute shell 4 may be placed on base 50. If any of the elements handling refrigerating fluid became inoperative, however, base 50 and all the elements thereon would ordinarily be returned to the factory and replaced as a whole.

The invention described above is not limited to the details shown, but is intended to cover all modifications, substitutions and equivalents within the scope of the following claims.

I claim:

1. In an air conditioner: a casing including a tray member, an open-bottom shell member supported on the tray member and removably secured thereto; a plurality of refrigerant handling elements affixed in one of said members in spaced relationship with one another and including a refrigerant compressor, condenser, evaporator, and fluid conduits connected therebetween; a plurality of air handling elements affixed in the other of said members in spaced relationship to one another and including at least one fan and fan motor, and an air filter; and air intake and discharge aperture means in at least one of said members; the elements in one of said members interdigitating between those in the other of said members whereby the air handling elements may be separated, as a unit, from the refrigerant handling members by removal of said shell member from said tray member.

2. In an air conditioner: a casing including a tray member and an open-bottom shell member fitting on the tray member and removably secured thereto; a plurality of refrigerant handling elements affixed on said tray member in spaced relationship with one another and extending upwardly from the tray member, said elements including a refrigerant compressor, condenser, evaporator, and fluid conduits connected therebetween; a plurality of air handling elements suspended within the shell member in spaced relationship to one another and including at least one fan and fan motor, and an air filter; and air intake and discharge aperture means in at least one of said members; the elements in one of said members interdigitating between those in the other of said members whereby the air handling elements may be separated, as a unit, from the refrigerant handling members by lifting of said shell member from said tray member.

3. In an air conditioner: a casing adapted to be mounted with an inner end disposed within a confined space and with an outer end disposed exteriorly of the confined space, and including a tray member and an open-bottom shell member fitting on the tray member and removably secured thereto; a plurality of refrigerant handling elements affixed on said tray member and including a refrigerant compressor, condenser, evaporator, and fluid conduits connected therebetween; said compressor and condenser extending upwardly from said tray and being disposed adjacent the outer end of the tray, said evaporator extending upwardly from the tray and being disposed adjacent the inner end of the tray; a plurality of air handling elements affixed in said shell member in spaced relationship to one another and including a pair of fans with fan motors, and an air filter; said fans and fan motors being respectively disposed adjacent the outer and inner ends of said shell member, said air filter being disposed between said fans and fan motors, and a pair of air intake and discharge aperture means in the outer and inner ends of said shell member; the elements on said tray member interdigitating between those in said shell member whereby the air handling elements may be separated, as a unit, from the refrigerant handling members by removal of said shell member from said tray member.

4. In an air conditioner: a casing adapted to be mounted with an inner end disposed within a confined space and an outer end disposed outside of the confined space including a tray member and an open-bottom shell member fitting on the tray member and removably secured thereto; a plurality of refrigerant handling elements affixed on said tray member and including a refrigerant compressor, condenser, evaporator, and fluid conduits connected therebetween, said compressor and condenser being disposed adjacent the outer end of said tray member, said evaporator being disposed adjacent the inner end of said tray member; a plurality of air handling elements affixed in the other of said members in spaced relationship to one another and including first and second fan and fan motor units respectively disposed adjacent the outer and inner ends of said shell member, and an air filter disposed between said pair of fans and fan motors, a pair of air intake and discharge aperture means in the outer end of said shell member; a pair of air intake and discharge aperture means in the inner end of said shell member, and baffle means on at least one of said members for directing outside air from the aperture means in the outer end of said shell to the first fan and fan motor unit and for directing said outside air through said condenser and thence out through the outside discharge aperture means, and baffle means on at least one of said members for directing recirculated air entering through the intake aperture means in the inner end of said shell through said filter and thence through said evaporator, said second fan, and thence through the discharge aperture means in the inner end of said shell to said confined space; the elements on said tray member interdigitating between those in the shell member whereby the air handling elements may be separated, as a unit, from the refrigerant handling members by removal of said shell member from said tray member.

5. The combination claimed in claim 4, said tray member having an air intake aperture therein in the position normally lying outside the confined space, said filter being disposed inwardly of said aperture.

6. In the combination claimed in claim 5, an upstanding lip surrounding said aperture, whereby to prevent moisture collecting on said tray from entering said aperture.

7. The combination claimed in claim 6 and damper means in said shell, said damper means being disposed on the low-pressure side of said second fan and in the portion of said shell normally lying within said room and between said evaporator and said second fan, whereby to admit room air to said second fan while by-passing said evaporator.

References Cited in the file of this patent

UNITED STATES PATENTS

| | | |
|---|---|---|
| 2,335,627 | Wolfert | Nov. 20, 1943 |
| 2,386,883 | Ames | Oct. 16, 1945 |
| 2,496,355 | Peltier | Feb. 7, 1950 |